United States Patent [19]

Haar et al.

[11] 4,236,760
[45] Dec. 2, 1980

[54] BRAKE-FORCE REGULATOR FOR DUAL-CIRCUIT BRAKE SYSTEMS

[75] Inventors: Lucas H. Haar, Niddatal; Ernst-Dieter Schäfer, Bad Nauheim, both of Fed. Rep. of Germany

[73] Assignee: ITT Industries, Inc., New York, N.Y.

[21] Appl. No.: 16,659

[22] Filed: Mar. 1, 1979

[30] Foreign Application Priority Data

Apr. 4, 1978 [DE] Fed. Rep. of Germany ....... 2814414

[51] Int. Cl.³ .............................................. B60T 8/02
[52] U.S. Cl. .................................... 303/6 C; 188/349; 303/24 A; 303/24 C; 303/24 F
[58] Field of Search .................... 303/6 C, 6 R, 22 A, 303/24 C, 24 F, 24 A, 24 R, 84 A, 84 R; 188/349

[56] References Cited

U.S. PATENT DOCUMENTS

| 3,738,709 | 6/1973 | Stokes | 303/6 C |
| 3,969,000 | 7/1976 | Ohta et al. | 303/6 C |
| 4,071,281 | 1/1978 | Tomoyuki | 303/24 A |

FOREIGN PATENT DOCUMENTS 2265106  4/1976  Fed. Rep. of Germany .......... 303/6 C

*Primary Examiner*—Douglas C. Butler
*Attorney, Agent, or Firm*—John T. O'Halloran; Alfred C. Hill

[57] ABSTRACT

A brake-force regulator for dual-circuit brake systems including first and second stepped pistons disposed in a multiple-step housing bore such that the end of the smaller diameter portion of both the first and second piston abut one another. An inlet chamber coupled to the master cylinder is provided adjacent the annular surface between the larger diameter portion and the smaller diameter portion of each of the first and second pistons. A first output chamber coupled to one of the brake circuits is provided adjacent the end of the larger diameter portion of the first piston and a second output chamber coupled to the other brake circuit is provided adjacent the end of the larger diameter portion of the second piston. A first valve is associated with the first piston to couple the associated one of the inlet chambers to the first outlet chamber and a second valve is associated with the second piston to couple the associated one of the inlet chambers to the second outlet chamber. A spring is provided to urge the first piston against the second piston and a stop is provided for the second piston such that when the second piston is against the stop the second valve is kept open. Two different embodiments are disclosed in which the first valve is a deceleration-responsive valve and the second valve is a pressure-responsive valve and a third embodiment is disclosed in which both the first and second valves are pressure-responsive valves.

31 Claims, 3 Drawing Figures

BRAKE-FORCE REGULATOR FOR DUAL-CIRCUIT BRAKE SYSTEMS

BACKGROUND OF THE INVENTION

The present invention relates to a brake-force regulator and more particularly to a brake-force regulator for a dual-circuit brake system.

From German Patent DE-AS No. 2,265,106 a brake-force regulator is known in which the rear wheels of a vehicle are controlled by two separate brake circuits. The regulator includes two pressure-fluid valves arranged in tandem, each valve controlling the fluid connection between a fluid source and a wheel-brake cylinder of a circuit. The first valve is a pressure reducing valve including an axially slidable stepped piston having acting on it a control force introduced from without. The smaller area of the stepped piston is acted upon by the pressure of the fluid source, and its larger area is acted upon by the pressure supplied to the wheel brakes in opposition to the control force. The second valve is a pressure-limiting valve whose closure member is arranged in an axially movable second piston and bears against the regulator housing through a tappet. On the side of the second piston close to the stepped piston, the closure member of the first valve bears against the side of the second piston adjacent the stepped piston through a tappet.

If both brake circuits are operative, the known brake-force regulator functions as follows:

In the regulator's inactive position, both valves are open and, as a result, the fluid flows to the wheel cylinders unhindered at the beginning of braking. By increasing the pressure in the brake system, the stepped piston is displaced against the control force. Since at the same moment the pressure in the outlet chamber of the second brake circuit would preponderate, the second piston follows the stepped piston until the second valve closes. When the pressure continues to increase, the stepped piston continues moving against the control force so that the first valve closes, too. As a result, outlet chambers are pressurized to a reduced braking pressure. The second piston ensures that the pressures in both outlet chambers are of equal magnitude.

If the second brake circuit fails, the function of the pressure-reducing valve in the stepped piston will remain unchanged, only the change-over pressure of the valve will be lower. Should, however, the first brake circuit fail, with the pressure in the second brake circuit increasing the second piston will be displaced against the control force, causing the stepped piston to follow its movement, until the second valve closes. A further increase of the braking pressure beyond the changeover pressure is not possible because the second valve can only operate as a pressure limiter in the event of failure of the first circuit.

The change-over pressure of the pressure-limiting valve is attained at a very low pressure if the first brake circuit has failed. As a result, only a minor braking effect is achieved at the brake associated with the second brake circuit. If the second brake circuit fails, the first valve continues to function as a pressure-reducing valve. However, the change-over pressure and, consequently, the braking effect are lower. It is, however, in the event of a brake-circuit failure, important to achieve the best possible braking effect with the still intact brake circuit. Therefore, a reduction of the braking effect is far from being desirable in the event of a brake-circuit failure.

SUMMARY OF THE INVENTION

It is, therefore, an object of the present invention to provide a brake-force regulator which assures, even in the event of failure of any one brake circuit, an unreduced increase of the braking pressure in the intact brake circuit up to an increased change-over pressure, from which changeover pressure on, regulation of the braking pressure can be continued.

A feature of the present invention is the provision of a brake-force regulator for a dual-circuit brake system comprising: a housing having a longitudinal multiple-step bore therein; a first stepped piston slidably sealed to the inner surface of the bore; a second stepped piston slidably sealed to the inner surface of the bore, the end of the smaller diameter portion of the second piston abutting the end of the smaller diameter portion of the first piston under influence of a spring; a first inlet chamber coupled to a master cylinder disposed adjacent a first annular surface between the larger diameter portion and the smaller diameter portion of the first piston; a second inlet chamber coupled to the master cylinder disposed adjacent a second annular surface between the larger diameter portion and the smaller diameter portion of the second piston; a first outlet chamber coupled to one of the brake circuits disposed adjacent the end of the larger diameter portion of the first piston; a second outlet chamber coupled to the other of the brake circuits disposed adjacent the end of the larger diameter portion of the second piston; a first valve associated with the first piston to connect the first inlet chamber to the first outlet chamber; a second valve associated with the second piston to connect the second inlet chamber to the second outlet chamber; and a first stop disposed transverse of the bore against which the second piston bears, the second piston keeping the second valve open when the second piston bears against the stop.

The essential advantage of the brake-force regulator of this invention is to be seen in that, even in the event of any one brake circuit failing, the braking pressure in the intact brake circuit is raised unreduced up to an increased change-over pressure from which point on its regulation can be continued.

In a preferred embodiment of the present invention, a deceleration-responsive valve is associated with the first stepped piston. In a regulator of this type, which operates dependent on the vehicle's deceleration, the change-over pressure is adapted to the coefficient of friction between tire and road. If it is, however, desired to have a fixed change-over pressure of the regulator, it will be an advantage to arrange a pressure-responsive regulating valve in each of the first and second pistons. The spring urging the first piston against the second piston may be inserted directly between the large area of the first piston and the regulator housing. In such an arrangement, the first piston has the spring bearing on it at all times. In order to take into account the vehicle's load in the brake-force regulating function, it is an advantage to have a variable change-over pressure of the valves in response to the vehicle's load. In a particularly simple and low-cost embodiment of the valve associated with the second piston, the large step of the second piston is designed as a valve-closure member. According to a preferred improvement of the deceleration-responsive valve, this valve comprises a ball and a valve seat disposed at a pressure-fluid opening in the first piston, with the ball and the valve seat being arranged in a chamber in the first piston. Such an arrangement permits the regulator to have a smaller size and reduced weight.

In deceleration-responsive valves it may happen that the ball, in particular shortly before the closing point is reached, engages the valve seat and closes the opening inadvertently or too early as a result of vibrations caused, for example, by uneven road surfaces. It is, therefore, an advantage to provide means preventing unintentional or too early closing of the valve. Preferably, a control pin directed toward the valve of the first piston and spring-loaded in the direction of this valve is provided which is moved against the preload at a specific pressure, thus, unblocking the closure travel for the valve. When arranging such a control pin in combination with a deceleration-responsive valve, it is useful if the pressure required for movement of the control pin is lower than the minimum change-over pressure of the valve. The effective area of the control pin determines in essence the valve's change-over pressure. To ensure that the changeover pressure of the intact circuit means unchanged in the event of a failure of a brake circuit, it is an advantage in pressure-responsive regulators if the effective area of the control pin is equal to the front area of the piston's smaller step, and in deceleration-responsive regulators it is an advantage if the effective area of the control pin is greater than the piston's smaller step. In pressure-responsive regulators it is useful to provide the control pin with a stop limiting the travel of the control pin in opposition to its preload, this travel being preferably longer than the sum of the closing travels of both valves. The valve in the first piston is thereby given the possibility to reopen after covering a specific distance and to allow the supply of fluid. Particularly suitable is an arrangement in which the spring bearing upon the control pin bears at the same time upon the first piston in the same direction, because this arrangement necessitates only one spring for the control pin and the stepped piston.

It is another advantage to provide the control pin with a discoid radial projection whose one side has the spring bearing against it and whose other side is in abutment with the larger area of the piston in the unpressurized state of the regulator. In this arrangement, the piston is returned to its inactive position by the spring, the spring force ceasing, however, to act on the piston when the change-over pressure in the first brake circuit is attained. In order to prevent the whole amount of spring force from bearing upon the pistons in the regulator's inactive position, it is useful to anchor the spring. In a deceleration-responsive valve, in which the ball is located in a chamber in the first piston, it is an advantage to arrange a pressure fluid inlet of the chamber at a location at which the fluid flow entering the chamber supports a stable position of the ball.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
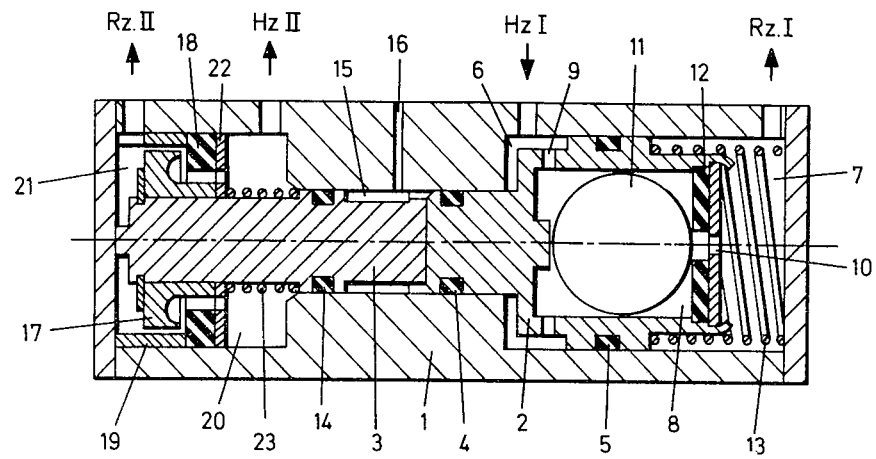
FIG. 1 is a longitudinal cross-sectional view of a brake-force regulator including a pressure-responsive and a deceleration-responsive valve in accordance with the prinicples of the present invention.

FIG. 1 shows a brake-force regulator housing 1 with a multiple-stepped bore accommodating a first piston 2 and a second piston 3. Both pistons 2 and 3 are stepped pistons, bearing against each other with their smaller diameter portion. The effective areas of both pistons 2 and 3 are of equal size. First piston 2, sealed relative to housing 1 by means of sealing rings 4 and 5, has one side providing a boundary for an inlet chamber 6 and its other side provides a boundary for an outlet chamber 7 of a first brake circuit (Hz I master cylinder, Rz I wheel cylinder). Formed within first piston 2 is a hollow space 8 which connects with inlet chamber 6 with outlet chamber 7 through openings 9 and a bore 10. Hollow space 8 accommodates a ball 11 and a sealing ring 12 surrounding bore 10 and functioning as a valve seat. Disposed in outlet chamber 7 between housing 1 and first piston 2 is a control spring 13 exerting a force upon first piston 2 in the direction towards second piston 3. On its smaller diameter portion, second piston 3 is sealed relative to housing 1 by means of a sealing ring 14 and has on its lateral area between sealing ring 14 and the front area close to first stepped piston 2 an annular groove 15 exposed to atmospheric pressure through a bore 16. The larger diameter portion of second piston 3 is a valve-closure member 17 located at a small distance from an annular valve seat 18 which is fastened in the stepped bore and is supported from the front of housing 1 through a spacer ring 19. The side of valve seat 18 close to the smaller diameter portion of piston 3 provides a boundary for an inlet chamber 20, while the other side of valve seat 18 provides a boundaryy for an outlet chamber 21 of a second brake circuit (Hz II master cylinder, Rz II wheel cylinder). Disposed on the side of valve seat 18 close to inlet chamber 20 is an apertured disc 22. A spring 23 is disposed between second piston 3 and disc 22 and applies a force on disc 22 in the direction towards valve seat 18.

The mode of operation of the brake-force regulator of FIG. 1 shall first be considered for the case of both brake circuits being operative. In the rest position of the arrangement, control spring 13 urges first piston 2 against second piston 3 which bears against the front of housing 1, thereby keeping the associated valves open. During braking, there occurs an even pressure build-up in the brake circuits until, at a specific vehicle deceleration, ball 11 is moved towards sealing ring 12, thereby closing bore 10. The valve associated with second piston 3 continues to be open because piston 3 is not yet in a position to move. With the pressure continuing to increase, first piston 2 is displaced against control spring 13, and a reduced braking pressure is delivered to the wheel cylinder of first brake circuit Rz I. The movement of first piston 2 enables second piston 3 to move in the same direction whereby the valve associated with second piston 3 closes by engagement of valve-closure member 17 with valve seat 18. In both brake circuits there prevails the same reduced output pressure. With the pressure on the input side continuing to increase, first piston 2 continues to be displaced against control spring 13, and both stepped pistons 2 and 3 regulate the braking pressure evenly on the output side independently of one another.

If the second brake circuit Hz II, Rz II fails as a result of a defect, the operation of first piston 2 is as described above. Second piston 3 does not, however, move.

Conversely, if first brake circuit Hz I, Rz I fails, the valve associated with second piston 3 will remain open until the differential force acting on piston 3 is of a magnitude sufficient to overcome the force of control spring 13. The valve operates in response to pressure, with its change-over pressure being determined by the area of the smaller diameter portion of piston 3.

Figure 2:
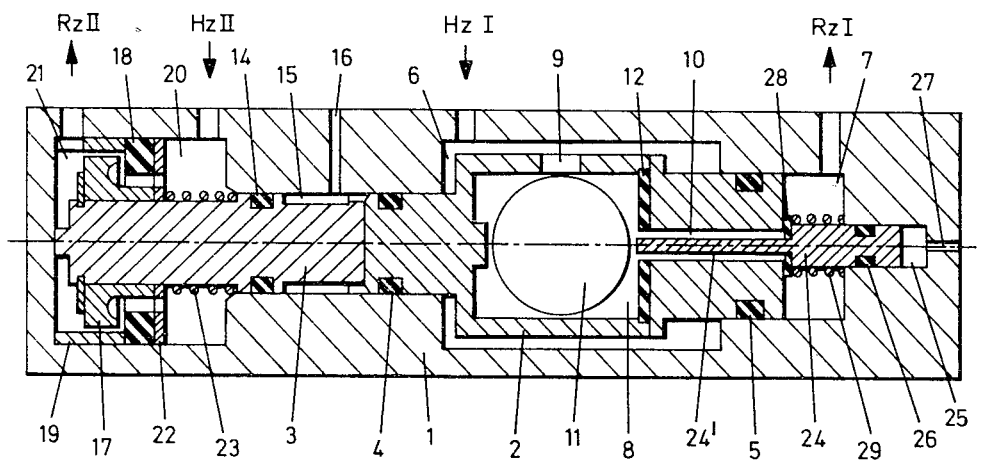
FIG. 2 is a longitudinal cross-sectional view of a brake-force regulator including a pressure-responsive and a deceleration-responsive valve and means preventing unintentional or too early closing of the deceleration-responsive valve in accordance with the principles of the present invention.

FIG. 2 shows a brake-force regulator corresponding in essence to the arrangement described with reference to FIG. 1. Thus, like parts have been assigned like reference numerals in both Figs. To avoid repetitions, only the differences between FIG. 1 and FIG. 2 shall be discussed here. The opening 9, which connects inlet chamber 6 of the first brake circuit with hollow space 8, is disposed in first piston 2 approximately in the middle between the transverse walls of hollow space 8. The control spring 13 is omitted in an arrangement according to FIG. 2. A control pin 24, which includes a larger-diameter portion and a reduced-diameter portion 24', has its larger-diameter portion arranged in housing 1 such that it is guided in a bore 25 and slidable therein in its longitudinal direction. Control pin 24 is sealed relative to housing 1 by means of a sealing ring 26. Atmospheric pressure enters bore 25 through an opening 27. Control pin 24 includes a radial projection 28 having one side resting against the larger diameter portion of first stepped piston 2 and its other side acted upon by a spring 29 bearing against housing 1. Projection 28 is required to ensure the passage of fluid when it is in engagement with piston 2. The reduced-diameter portion 24' of control pin 24 is housed in bore 10 and slightly extends into hollow space 8.

The mode of operation of the regulator of FIG. 2 will first be described for the case where both brake circuits are operative. In the regulator's rest position, spring 29 urges one side of radial projection 28 against first piston 2 which is urged against second piston 3 bearing against the front of housing 1, thereby keeping the associated valves open. During braking, there occurs an even pressure build-up in both brake circuits. The increasing pressure acts upon the front area of control pin 24 in space 8, causing control pin 24 to be moved to the right against its preload at a specific pressure which is preferably slightly lower than the change-over pressure, and, thereby, unblocking the valve seat formed by the seal 12. At a specific vehicle deceleration, ball 11 moves into engagement with seal 12, thus closing bore 10. The valve associated with second piston 3 continues to be open, because second piston 3 is held in its position by the first piston 2. With the pressure continuing to increase, first piston 2 is displaced in the direction towards outlet chamber 7, causing a reduced braking pressure to act upon the wheel cylinder of the first brake circuit Rz I. The movement of first piston 2 enables second piston 3 to be moved in the same direction whereby the valve associated with second piston 3 closes by engagement of valve-closure member 17 with valve seat 18. In both brake circuits there prevails the same input pressure and the same reduced output pressure. With the pressure on the input side continuing to increase, first piston 2 continues to be displaced in the direction towards outlet chamber 7, and both stepped piston 2 and 3 regulate the braking pressure evenly on the output side independently of one another.

If second brake circuit Hz II, Rz II fails as a result of a defect, the operation of first piston 2 is as described above. Second piston 3 does not move.

Should first brake circuit Hz I, Rz I fail, the valve associated with second piston 3 will remain open until the differential force acting on piston 3 is of a magnitude sufficient to overcome the force of spring 29 and to displace first piston 2 and pin 24 against the force of spring 29. The valve operates in response to pressure, with the change-over pressure being determined by the force of spring 29 and the frictional forces on sealing rings 4, 5 and 26.

Figure 3:
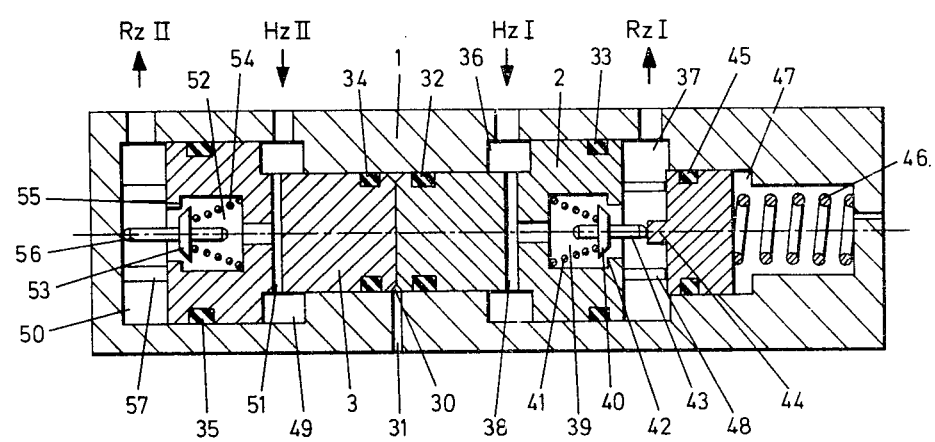
FIG. 3 is a longitudinal cross-sectional view of a brake-force regulator including two pressure-responsive valves in accordance with the principles of the present invention.

FIG. 3 shows a brake-force regulator housing 1 including a multiple-stepped bore accommodating first piston 2 and second piston 3. Both pistons 2 and 3 are stepped pistons and have effective areas of the same size. Pistons 2 and 3 bear against each other with their smaller diameter portion, forming at their contact line an annular chamber 30 which is pressurized by atmospheric pressure through a bore 31. First and second pistons 2 and 3 are sealed relative to housing 1 by means of sealing rings 32, 33 and 34, 35, respectively. The larger diameter portion of first piston 2 forms with its annular surface a boundary for an inlet chamber 36 and with its front area a boundary for an outlet chamber 37 of a first brake circuit (Hz I, Rz I). A radial bore 38 and a coaxial fluid passage 39 at the interior of first piston 2 provide a connection between inlet chamber 36 and outlet chamber 37. Fluid passage 39 accommodates a valve-closure member 40 which is preloaded against a valve seat 42 by a spring 41. Valve-closure member 40 includes a tappet 43 extending out of first piston 2 and abutting against a control pin 44 which is movable in its longitudinal direction. Control pin 44 is sealed relative to housing 1 by means of a sealing ring 45 and is preloaded in the direction towards first piston 2 by a spring 46. A stop 47 limiting the travel of control pin 44 is provided in housing 1. Spacers 48 directed towards pin 44 are disposed on the front of the larger diameter portion of piston 2.

The larger diameter portion of second piston 3 forms with its annular surface a boundary for an inlet chamber 49 and with its front area a boundary for an outlet chamber 50 of a second brake circuit (Hz II, Rz II). A radial bore 51 and a coaxial fluid passage 52 at the interior of second piston 3 provide a connection between inlet chamber 49 and outlet chamber 50. Fluid passage 52 accommodates a valve-closure member 53 which is preloaded against a valve seat 55 by a spring 54. Valve-closure member 53 includes a tappet 56 which bears against the front wall of housing 1. Second piston 3 likewise bears against the front wall of housing 1 by means of spacers 57.

The mode of operation of the regulator illustrated in FIG. 3 shall first be described for the case of both brake circuits being operative. In the regulator's rest position, spring 46 urges pin 44 against spacers 48 of first piston 2. The force acts from first piston 2 onto second piston 3 as a result of which the latter is urged against the front wall of housing 1. The valves in both pistons are open. During braking, there occurs an even pressure build-up in both brake circuits. The increasing pressure acts on control pin 44, causing it to be moved to the right against its preload when the change-over pressure is reached, and spring 41 urges valve-closure member 40 against valve seat 42. The valve associated with second piston 3 continues to be open, because second piston 3 is held in its position by first piston 2. With the pressure continuing to increase, first piston 2 is displaced in the direction towards outlet chamber 37, causing a reduced braking pressure to act upon the wheel cylinder of a first brake circuit Rz I. The movement of first piston 2 causes second piston 3 to move in the same direction whereby the valve associated with second piston 3 closes by engagement of valve-closure member 53 with valve seat 55. In both brake circuits there prevails the same input pressure and the same reduced output pressure. With the pressure on the input side continuing to increase, first piston 2 continues to be displaced in the direction towards outlet chamber 37, and both stepped pistons 2 and 3 regulate the braking pressure independently of one another. Stop 47 is so arranged that the travel of control pin 44 is slightly greater than the sum of the closure travels of both valves. On sufficient displacement of first piston 2, tappet 43 will reach control pin 44 again and valve-closure member 40 will be lifted off its valve seat 42. The supply of pressure fluid causes first piston 2 to be moved in the direction towards inlet chamber 36 until the valve is closed again. After the valve disposed in second piston 3 is closed, second piston 3 is displaced in the direction towards outlet chamber 50, as a result of which tappet 56 abuts again against the front wall of housing 1 and valve-closure member 53 is lifted off its valve seat 55. The supply of pressure fluid causes a displacement of second piston 3 in the direction towards inlet chamber 49 until the valve closes again.

In the event of failure of one of the brake circuits as a result of a defect, the mode of operation of the still operable brake circuit remains unchanged. Also, the change-over point (change-over pressure) of valve 53, 55 remains unchanged if the pressure-actuated area of control pin 44 is equal to the front area of the smaller diameter portion (contacting area) of pistons 2 and 3.

While we have described above the principles of our invention in connection with specific apparatus it is to be clearly understood that this description is made only by way of example and not as a limitation to the scope of our invention as set forth in the objects thereof and in the accompanying claims.

We claim:

1. A brake-force regulator for a dual-circuit brake system comprising:
    a housing having a longitudinal multiple-step bore therein;
    a first stepped piston slidably sealed to the inner surface of said bore;
    a second stepped piston slidably sealed to the inner surface of said bore, the end of the smaller diameter portion of said second piston directly abutting the end of the smaller diameter portion of said first piston under influence of a spring;
    a first inlet chamber coupled to a master cylinder disposed adjacent a first annular surface between the larger diameter portion and the smaller diameter portion of said first piston;
    a second inlet chamber coupled to said master cylinder disposed adjacent a second annular surface between the larger diameter portion and the smaller diameter portion of said second piston;
    a first outlet chamber coupled to one of said brake circuits disposed adjacent the end of the larger diameter portion of said first piston;
    a second outlet chamber coupled to the other of said brake circuits disposed adjacent the end of the larger diameter portion of said second piston;
    a first valve associated with said first piston to connect said first inlet chamber to said first outlet chamber;
    a second valve associated with said second piston to connect said second inlet chamber to said second outlet chamber; and
    a first stop disposed transverse of said bore against which said second piston bears, said second piston keeping said second valve open when said second piston bears against said stop.
2. A regulator according to claim 1, wherein said first valve is a deceleration-responsive valve.
3. A regulator according to claim 2, wherein said second valve is a pressure-responsive valve.
4. A regulator according to claim 3, wherein said spring is disposed between the end of the larger diameter portion of said first piston and a transverse end wall of said housing.
5. A regulator according to claim 3, wherein said deceleration-responsive valve has a change-over pressure which is variable in response to the deceleration of a vehicle upon which said regulator is mounted.
6. A regulator according to claim 3, wherein the larger diameter portion of said second piston is a valve-closure member for said pressure-responsive valve.
7. A regulator according to claim 2, wherein said deceleration-responsive valve has a change-over pressure which is variable in response to the deceleration of a vehicle upon which said regulator is mounted.
8. A regulator according to claim 2, wherein said deceleration-responsive valve is disposed in a chamber within said first piston having pressure-fluid openings into said first inlet chamber and said first outlet chamber.
9. A regulator according to claim 8, wherein said deceleration-responsive valve includes
    a ball in said chamber, and
    a valve seat disposed at the adjacent end of that one of said pressure-fluid openings communicating with said first outlet chamber.
10. A regulator according to claim 9, wherein the other of said pressure-fluid openings is located such that fluid flow into said chamber supports a stable position of said ball.
11. A regulator according to claim 9, further including
    means associated with said one of said pressure-fluid openings to prevent unintentional closing of said deceleration-responsive valve.
12. A regulator according to claim 11, wherein said means includes
    a control pin extending through said one of said pressure-fluid openings toward said ball preloaded by said spring in the direction of said ball, said control pin being moved against its pre-load at a specific pressure to unblock closure travel of said ball.
13. A regulator according to claim 12, wherein said specific pressure is lower than said change-over pressure of said deceleration-responsive valve.

14. A regulator according to claim 13, wherein the effective area of said control pin is greater than the area of the end of the smaller diameter portion of said first piston.

15. A regulator according to claim 12, wherein said control pin includes
   a discoid radial projection having one side bearing against the end of the larger diameter portion of said first piston, and
   said spring is disposed between the other side of said projection and a transverse end wall of said housing.

16. A regulator according to claim 15, wherein said spring is anchored.

17. A regulator according to claim 1, wherein said first valve is a first pressure-responsive valve, and
said second valve is a second pressure-responsive valve.

18. A regulator according to claim 17, wherein said first pressure-responsive valve has a change-over pressure which is variable in response to the load of a vehicle upon which said regulator is mounted.

19. A regulator according to claim 17, wherein the larger diameter portion of said second piston is a valve-closure member for said second pressure-responsive valve.

20. A regulator according to claim 17, wherein said first pressure-responsive valve is disposed in a chamber within said first piston, said chamber being in communication with said first inlet chamber and said first outlet chamber.

21. A regulator according to claim 20, further including
means associated with said first pressure-responsive valve to prevent unintentional closing of said first pressure-responsive valve.

22. A regulator according to claim 21, wherein said means includes
   a control pin engaging said first pressure-responsive valve pre-loaded by said spring toward said first pressure-responsive valve, said control pin being moved against its pre-load at a specific pressure to unblock closure travel of said first pressure-responsive valve.

23. A regulator according to claim 22, wherein said specific pressure is lower than said change-over pressure.

24. A regulator according to claim 23, wherein the effective area of said control pin is equal to the area of the end of the smaller diameter portion of said first piston.

25. A regulator according to claim 22, further including
   a second stop disposed in said bore to limit the travel of said control pin in opposition to its pre-load, the travel of said control pin being longer than the sum of the closing travel of both of said first and second pressure-responsive valves.

26. A regulator according to claim 22, wherein said spring is disposed between said control pin and a transverse wall of said housing.

27. A regulator according to claim 26, wherein said spring is anchored.

28. A regulator according to claim 1, wherein said spring is disposed between the end of the larger diameter portion of said first piston and a transverse end wall of said housing.

29. A regulator according to claim 2, wherein said first valve has a change-over pressure which is variable in response to the deceleration of a vehicle upon which said regulator is mounted.

30. A regulator according to claim 1, wherein the larger diameter portion of said second piston is a closure member for said second valve.

31. A regulator according to claim 1, further including
means associated with said first valve to prevent unintentional closing of said first valve.

* * * * *